Jan. 27, 1942.   L. B. CASE   2,271,060
OILTIGHT SEAL FOR FLEXIBLE COUPLINGS
Filed May 7, 1940
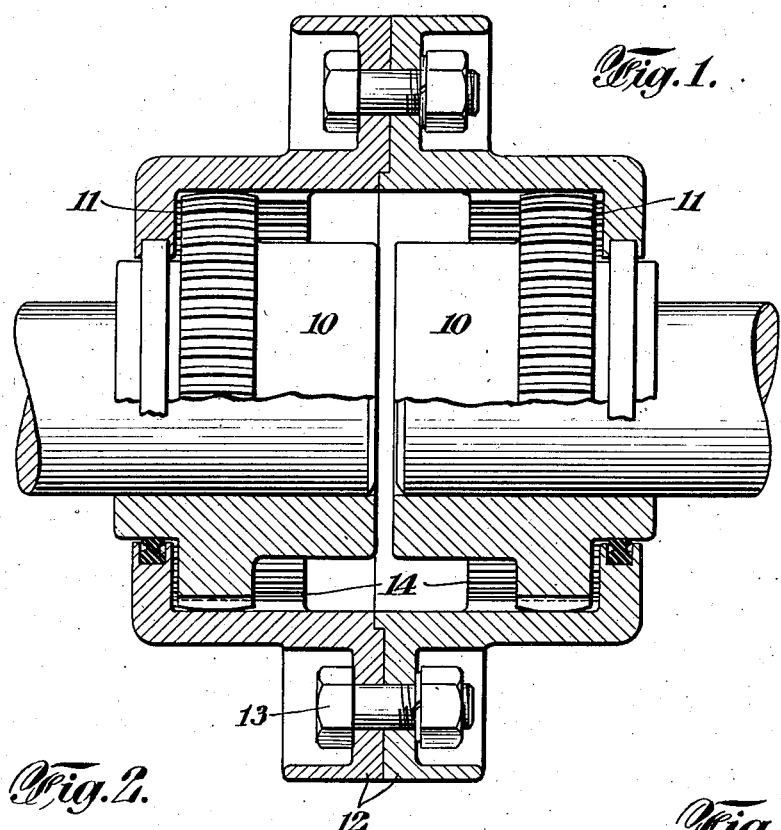
Fig. 1.
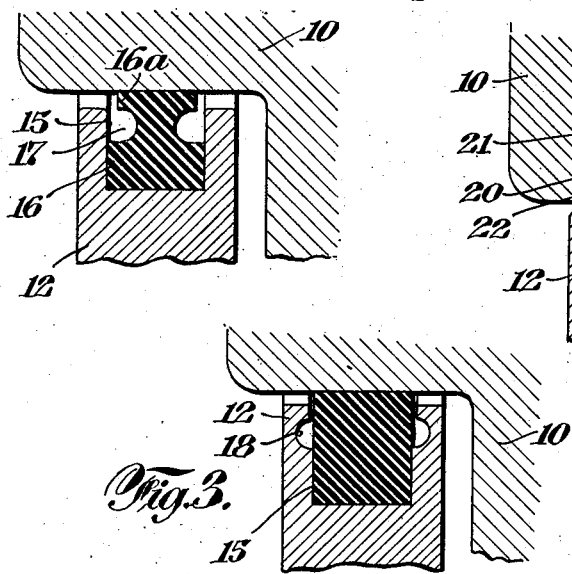
Fig. 2.
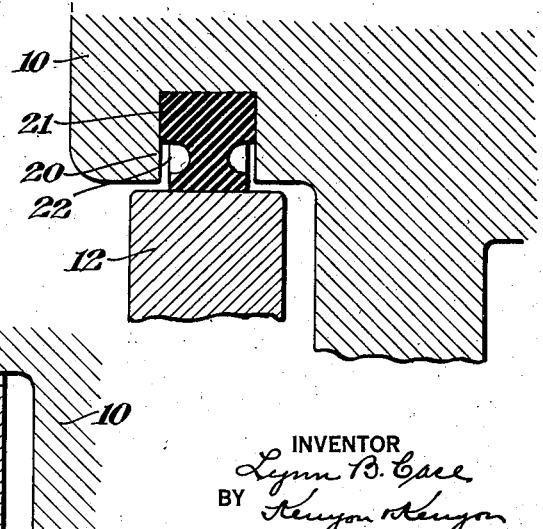
Fig. 4.
Fig. 3.
INVENTOR
Lynn B. Case
BY
Kenyon & Kenyon
ATTORNEYS.

Patented Jan. 27, 1942

2,271,060

UNITED STATES PATENT OFFICE 2,271,060

OILTIGHT SEAL FOR FLEXIBLE COUPLINGS

Lynn B. Case, New Brunswick, N. J., assignor to John Waldron Corporation, New Brunswick, N. J., a corporation of New Jersey Application May 7, 1940, Serial No. 333,757

1 Claim. (Cl. 64—9)

This invention relates to flexible couplings and more especially to flexible couplings of the gear type. Such a coupling consists of two identical externally geared hubs keyed to the shafts to be coupled. The hubs are connected and enclosed by a two-piece internally geared floating cover sleeve. The two pieces of the sleeve are rigidly interconnected so as to function as a single unit. In compensating for shaft misalinement, the cover sleeve generally assumes a neutral position between the hubs.

Heretofore, attempts have been made to provide an oil tight seal between the hubs and the sleeve by means of a ringe of resilient material interposed therebetween, the ring consisting largely of rubber. Such ring was set into a groove with the major portion thereof received within the groove and with just enough of the ring projecting beyond the edge of the groove to establish sealing contact. The ring was in contact with the entire surface of the groove in such manner that the major portion of the ring was positively confined and no substantial change of shape of the ring cross section was possible. In the operation of the flexible coupling, such ring was subjected to varying pressure conditions resulting from relative axial movement of the sleeve and hubs and the varying pressure applied to the exposed surface of the ring resulted in alternate compression and expansion of the ring without any substantial change of cross-sectional shape. The consequent change of density produced crystallization and fatigue, thus destroying the effectivenesss of the ring as a seal after a comparatively short life.

An object of this invention is the provision in a gear type coupling of a resilient sealing ring capable of change of cross-section when subjected to change of pressure, thereby avoiding change of density under varying pressure conditions with the result that the ring retains its resiliency and its high efficiency indefinitely.

According to this invention, the resilient ring is arranged in a groove and either the cross-sectional contour of the groove or the cross-sectional contour of the ring is such that when the ring is subjected to pressure variations there is a resulting change of cross-sectional shape without substantial change in the density. With this arrangement, advantage is taken of the characteristic of rubber that its resiliency is increased by repeated changes of applied pressure, providing the rubber is free to change shape without substantial variation in density. Crystallization and fatigue of the rubber are thus avoided and the ring retains its initial sealing effectiveness over a long period of time.

Other objects, novel features and advantages of this invention will become apparent from the following specification and accompanying drawing, wherein:

Fig. 1 is a sectional view of a gear type coupling equipped with a seal embodying the invention;

Fig. 2 is a fragmentary enlarged view similar to Fig. 1, and

Figs. 3 and 4 are similar views illustrating modifications of the seal.

The coupling is of standard construction and consists of two identical hubs 10 equipped with external gears 11 in combination with a sleeve composed of two identical sections 12 held together as a single rigid unit by bolts 13. Each sleeve section is provided with an internal gear 14, the teeth of which mesh with the teeth of a gear 11 in the usual manner. Suitable lubricant is provided in the sleeve to provide a frictionally reducing film between the gear teeth. Sufficient clearance is provided between the sleeve sections and the hubs to permit the necessary relative movement for proper operation of the coupling. Such clearance provides a passageway for the escape of oil from the cover sleeve during operation of the coupling. To prevent such escape of lubricant, a seal is provided between each cover section and each hub.

Referring now more especially to Fig. 2, an annular straight-wall groove 15 is provided in each cover section 12 and in the groove is arranged a ring 16 of resilient material. The overall section of the ring 16 is substantially the same as the cross-section of the groove 15, except that the inner edge of the ring projects beyond the inner edge of the groove sufficiently to contact with the outer surface of the hub 10 and the inner portion of the ring is of slightly less width than the width of the groove. As shown in Fig. 2, the ring 16 is provided with annular cut-outs at 17, such cut-outs lying below the inner edge of the groove 15 and from the inner periphery of the cut-outs, the ring 16 is of less width than the groove. When this ring is subjected to increased compression due to relative movement of the hub and cover, the material of the ring is not unduly compressed, but instead extends into the cut-out portions and the head portion 16a is free to tilt about some point in the body of the ring as a fulcrum. The ring 16, therefore, retains its elasticity indefinitely and as long as it retains its elasticity, the ring provides an oil tight seal between the cover sleeve and hub.

In the modification illustrated in Fig. 3, annular channels 18 are provided in the side walls of the groove 17 and the ring 19 has continuous side walls. With this arrangement, the application of a compression force to the inner face of the ring results in expansion of the ring 19 into the grooves 18, thereby preventing undue compression of the ring.

Fig. 4 illustrates a modification in which a groove 20 is provided in the hub 10 instead of a groove in the sleeve 12. A ring 21 of resilient material is mounted in this groove for co-operation with the sleeve to form an oil tight seal. The groove and ring combination is shown with an annular cut-out 22 in the ring and with straight side groove walls similar to the modification of Fig. 2. However, in place of such arrangement, the groove and ring arrangement may be similar to that illustrated in Fig. 3.

In flexible couplings of the gear type to which this invention relates, the coupler housing transmits the torque from one shaft to the other without rotational resiliency and without rotary movement of either shaft relative to the housing. The flexibility of the coupling is achieved through tipping of the axis of the housing relative to the axes of the shafts in cases when the shafts are not in true axial alignment. This tipping of the housing necessitates flexing of the portion of the gasket ring 16, or 21, intermediate the face thereof which is seated in the base of the groove, and the opposite face which is in tight contact with the opposing circular face of the hub 10 (as shown in Figs. 2 and 3) or of the cover section 12 (as shown in Fig. 4). Since there is no rotary movement of either shaft relative to the housing there is no rotary movement or slippage of either face of the gasket relative to the circular face of the shaft or housing with which it is contact. Such contact accordingly constitutes a dry oil-tight seal. No such dry, oil-tight seal is possible in devices wherein the gasket is required to slip or rotate relative to one of the faces with which it is in contact, for in such structures an oil film is necessary between the moving faces and the oil film permits passage or leakage of oil from the interior of the housing which is prevented by the present invention.

It is of course understood that various modifications may be made in the structure above described, without in any way departing from the spirit of the invention as defined in the appended claim.

I claim:

In a gear-type flexible coupling comprising a driving shaft, a driven shaft in substantial axial alignment with said driivng shaft and a coupler housing transmitting torque from one shaft to another, said housing and shafts having opposed circular faces and one of said faces having a groove, a resilient gasket in said groove, said gasket having a portion provided with parallel side walls snugly fitting the side walls of the groove at the bottom thereof and normally immovable thereon, said gasket having another portion out of contact with the side walls of the groove and having parallel side walls and a surface in oil-tight contact with the circular face opposite said groove and immovable thereon in normal operation of the coupling, and said gasket and the side walls of said groove having annular recesses between them intermediate said first and second named portions of the gasket, whereby the intermediate portion of the gasket is unrestrained but enclosed in said groove and whereby the gasket is capable of change of cross section within said groove when subjected to change of pressure.

LYNN B. CASE.